INVENTORS.
FREDERICK BONDZEIT
LEWIS J. NEELANDS
BY R H Quist
ATTORNEY.

MULTIPLE SLOPE ANALOG TO DIGITAL CONVERTER

Filed Jan. 29, 1968 2 Sheets-Sheet 2

INVENTORS.
FREDERICK BONDZEIT
LEWIS J. NEELANDS
BY R H Quist
ATTORNEY.

United States Patent Office 3,564,538

Patented Feb. 16, 1971

3,564,538

MULTIPLE SLOPE ANALOG TO DIGITAL CONVERTER

Frederick Bondzeit, Ormond Beach, and Lewis J. Neelands, DeLand, Fla., assignors to General Electric Company, a corporation of New York Filed Jan. 29, 1968, Ser. No. 701,189
Int. Cl. H03k 13/02
U.S. Cl. 340—347 3 Claims

ABSTRACT OF THE DISCLOSURE

A capacitor is charged to a potential proportional to an analog voltage to be converted to a digital form. It is first discharged through the level of a reference potential by a relatively high constant current, it is next discharged in the reverse direction through the reference potential by a lesser constant current, and it is finally discharged in the first direction through the reference potential by a relatively low constant current. The durations of each of the discharging currents are measured, with appropriate weightings given the higher currents, producing an accuracy equivalent to that attainable if only the relatively low current were employed.

BACKGROUND OF THE INVENTION

Figure 1:
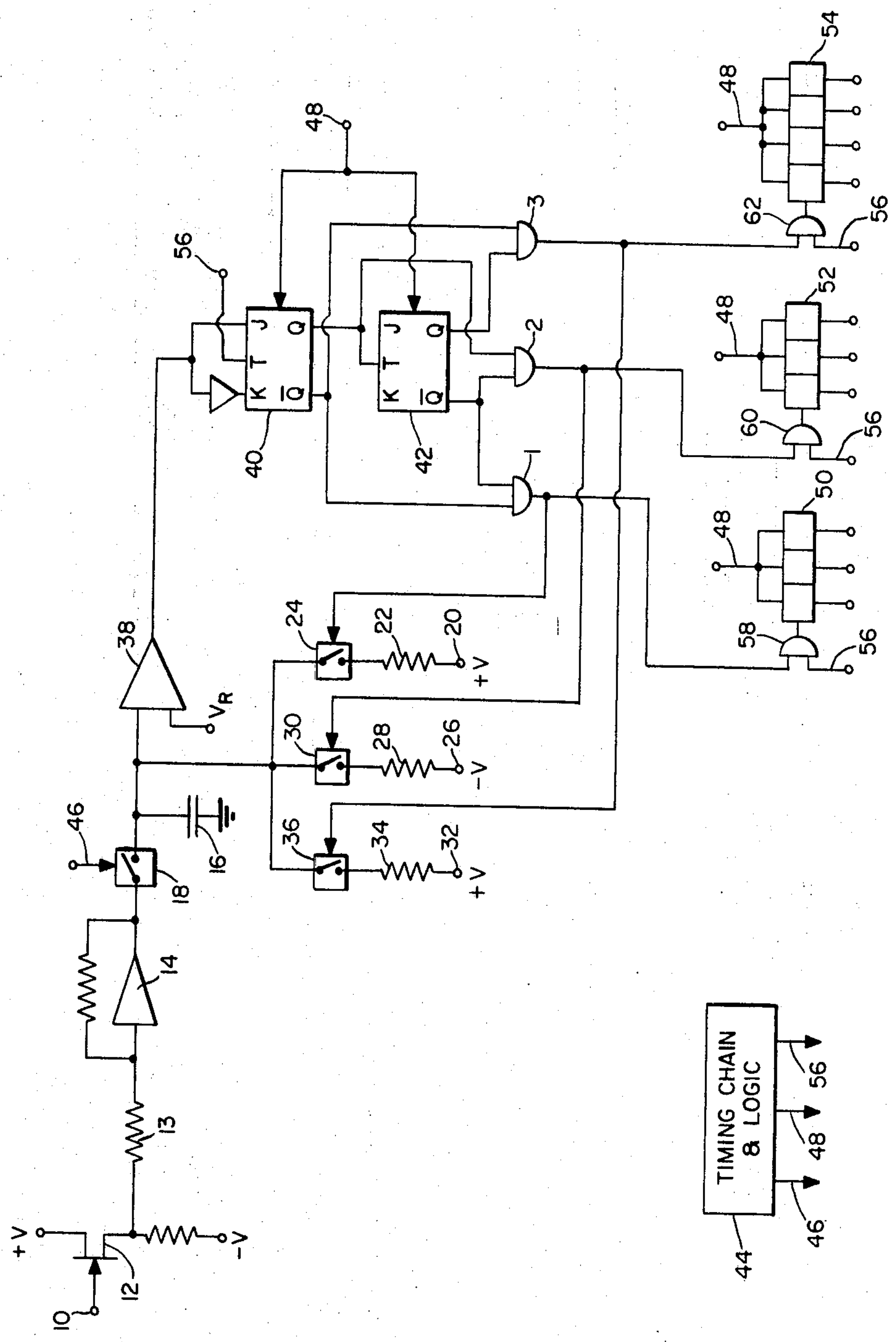

This invention relates generally to analog to digital converters, and more particularly to such a converter capable of rapid, yet accurate conversions.

Transducers are commonly employed which convert a physical measurement to an analog signal such as a voltage, the magnitude of which varies with changes in the measurement. Frequently it is necessary to transmit the measurement information to a remote point by wire or radio. The fact that an analog signal is subject to degradation in transmission has resulted in a number of methods to convert it to another type of signal more susceptible of accurate transmission.

Such a conversion has been performed by charging a capacitor to the analog signal voltage, and then linearly discharging the capacitor by a constant current with the resulting voltage ramp applied as one input to a comparator. The comparator output changes state when the voltage ramp passes through a reference voltage applied to the other input of the comparator. The duration of the comparator output signal from the beginning of the voltage ramp to the comparator transition varies linearly with the amplitude of the analog signal. The pulse duration signal thus produced may be used to modulate a subcarrier oscillator or encoded into a digital form.

Consider a graphical representation wherein clock counts form the abscissa and capacitor voltage the ordinate. With the capacitor being discharged at a constant rate, a linear function results, the slope of which depends upon the rate of discharge. If the discharge were instantaneous, there would be no difference in clock counts regardless of the initial capacitor voltage. The slower the discharge rate, the more accurate the measurement, since greater differences in clock counts result from differences in initial voltage levels. Slowing the discharge rate, however, has the adverse effect of diminishing the frequency at which measurements may be made.

SUMMARY OF THE INVENTION

It is an object of this invention to provide an analog to digital converter capable of performing rapid conversions without sacrificing accuracy.

In a preferred form of the invention, a capacitor is charged to a potential proportional to that of an analog signal. It is linearly discharged by a constant current towards a reference potential at a first, relatively rapid rate, while a counter records the number of counts required to reach the reference potential plus one count beyond. It is next linearly discharged by a second constant current towards the reference potential at a second, somewhat slower rate, while a second counter records the number of counts required to reach the reference potential plus one count beyond. The "overshoot" in this step will be smaller than that resulting from the higher first current. It is finally linearly discharged by a third constant current towards the reference potential at a third, relatively slow rate, while a third counter records the number of counts which elapse in reaching the reference potential plus one count beyond. The number of counts representing the magnitude of the analog signal is the sum of the weighted counts.

DESCRIPTION OF THE PREFERRED EMBODIMENT

Referring to FIG. 1, analog signals to be converted are applied to terminal 10 which is connected to the gate of field effect transistor 12. A negative (in this example) potential proportional to the magnitude of the analog signal is applied through resistor 13 to buffer amplifier 14. Buffer amplifier 14 amplifies the negative potential to a convenient working level and applied it to capacitor 16 when switch 18 is closed.

In the usual analog to digital converter, the time required for a constant current to discharge capacitor 16 from the potential to which it had been charged to a reference voltage would be measured. In accordance with this invention, multiple constant currents are employed. A first constant current is derived from positive potential source 20 together with resistor 22. This current will be delivered to capacitor 16 when switch 24 is closed. A second constant current is derived from negative potential source 26 together with resistor 28. This current will be delivered to capacitor 16 when switch 30 is closed. A third constant current is derived from positive potential source 32 together with resistor 34. This current will be delivered to capacitor 16 when switch 36 is closed.

Each of the constant currents referred to above causes a voltage ramp to be applied as one input to comparator 38, which has reference voltage $V_R$ applied as the other input. Each time a voltage ramp reaches the reference voltage, comparator 38 undergoes a transition, changing from a high level output to a low level output, or vice versa.

A two stage binary counter comprising flip flops 40 and 42 is provided to close switches 24, 30, and 36 at the appropriate times.

Figure 2:
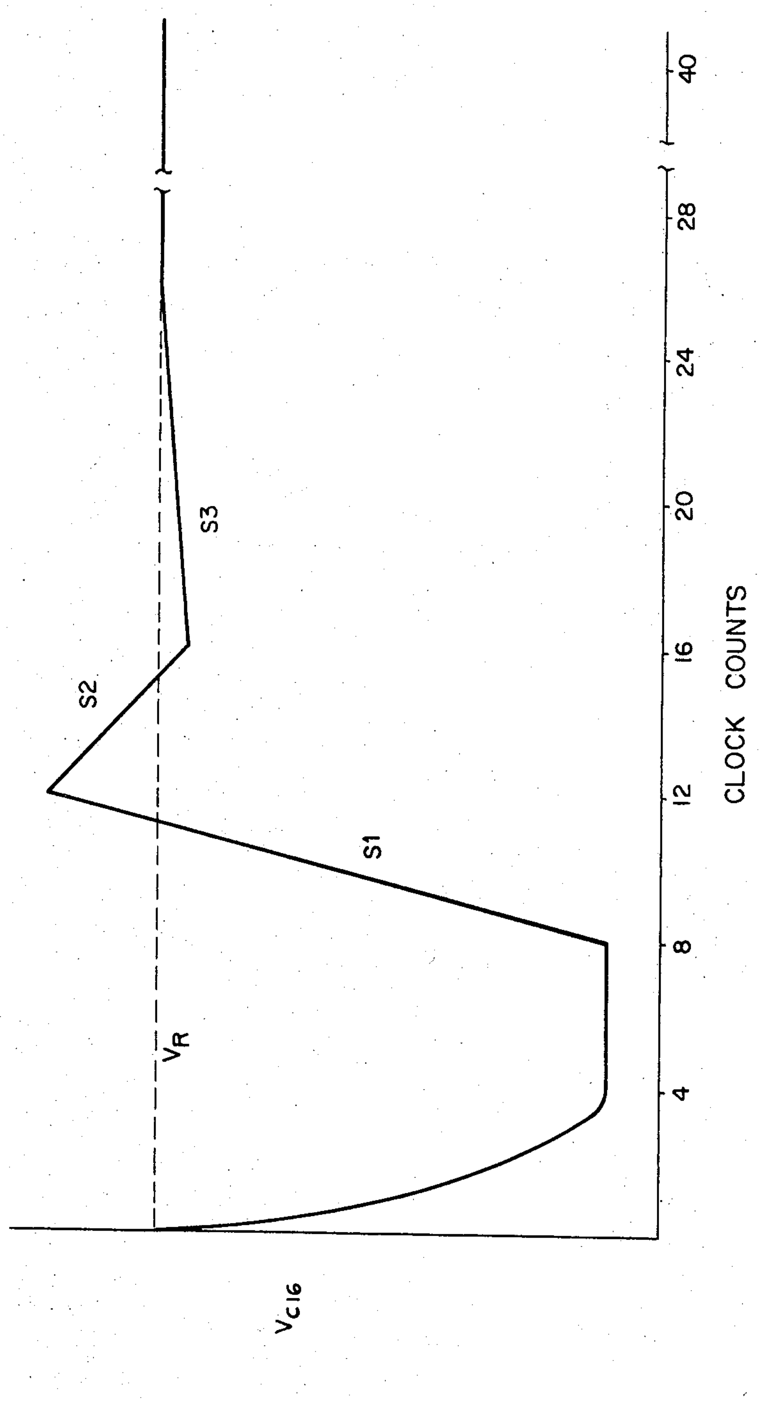

Timing chain and logic module 44 is utilized to provide synchronization of the system as well as other necessary signals. Taking a conversion cycle as 40 clock counts, timing chain and logic module 44 produces signal 46 closing switch 18 for eight counts. During this time capacitor 16 becomes charged to the level of the output of buffer amplifier 14. FIG. 2 illustrates the potential on capacitor 16 during a typical cycle. Set or reset signal 48 is next produced by timing chain and logic module 44 and delivered to flip flops 40 and 42 setting both of these to the $\overline{Q}$ output, enabling AND gate 1, and thereby closing switch 24 to apply the first constant discharge current to capacitor 16. Signal 48 is also applied: to set three stage synchronous counter 50 to a 111 state, to reset three stage synchronous counter 52 to a 000 state, and to reset four stage synchronous counter 54 to a 0000 state.

Clock pulses 56 are produced by timing chain and logic module 44 and delivered to AND gates 58, 60, and 62 of synchronous counters 50, 52, and 54 respectively; however, since only AND gate 58 is receiving an enabling input (from AND gate 1), only synchronous counter 50 begins counting. Clock pulses 56 are also delivered to flip flop 40; however, the output of this flip flop does not change until comparator 38 undergoes a transition. As shown in FIG. 2, this transition occurs between clock counts 11 and 12, so that at count 12 flip flop 40 changes to produce the Q output. Flip flop 42 is still producing the $\overline{Q}$ output so that AND gate 2 is enabled closing switch 30, and producing the second voltage ramp. Simultaneously, synchronous counter 52 begins accumulating clock counts.

The second voltage ramp crosses the reference voltage between counts 15 and 16, so that at count 16 flip flop 40 again changes to the $\overline{Q}$ output, the flip flop 42 changes to the Q output. This enables AND gate 3 which closes switch 36 producing the third voltage ramp. This ramp crosses the reference voltage at about count 25, with negligible overshoot so that capacitor 16 can be considered to be at the reference voltage potential.

In order to achieve the proper ten bit digital readout on synchronous counters 50, 52, and 54, the counters must be set or reset to the proper initial readings. As showns in FIG. 2, slope S2 is smaller than slope S1 and of the opposite sign, and slope S3 is still smaller. These slopes establish the relative weights to be given the clock counts. To obtain the decimal equivalent of the clock counts, the number of counts during the first slope is multiplied by 128, and added to the counts during the last slope. The counts during the second slope are multiplied by 16 and substracted from this total to obtain the final answer. This decimal equivalent represents the number of counts which would have occurred had acapacitor 16 been discharged from its initial voltage entirely by the current from source 32.

In the example illustrated in FIG. 2, voltage ramp S1 crosses the reference voltage $V_R$ after three counts so that at the fourth count slope S2 begins. These four counts multiplied by 128 produce a product of 512. The four counts during slope S2 are multiplied by 16 giving a product of 64 which is subtracted from the 512 giving a difference of 448. The ten counts during slope S3 are added to give the final decimal equivalent of 458.

The ten digit binary number which would give this result is 011 100 1010. To have three bit synchronous counter 50 produce this result it must be initially set to 111. This has the effect of subtracting the extra count which occurs after crossing the voltage reference. Three bit synchronous counter 52 is set initially to a reading of 000 and counts backward. This is accomplished by the connections to the flip flops of counter 52. Finally synchronous counter 54 is set to an initial 0000 reading.

The ten digit binary number can be read out of synchronous counters 50, 52, and 54 at the completion of a conversion cycle. In addition, the output of comparator 38 comprises pulses whose durations may also be used for conversion information.

While a particular embodiment of a multiple slope analog to digital converter has been shown and described, it will be obvious that changes and modifications can be made without departing from the spirit of the invention and the scope of the appended claims.

What is claimed is:

1. In an analog to digital converter having a capacitor which is charged to a potential proportional to an unknown analog signal, a comparator having a first input connected to said capacitor and a second input connected to a reference potential, said comparator producing a first output when its first input is larger than its second, and producing a second output when its second input is larger than its first, and having a transition from one output to the other when its two inputs become equal, the improvement comprising:

means to apply to said capacitor, in a sequential manner, a plurality of constant currents, decreasing in magnitude and derived from potential sources alternating in sign, whereby a plurality of voltage ramps will be applied to said first input of said comparator; and means for measuring the duration of said voltage ramps.

2. An analog to digital converter in accordance with claim 1 wherein:

said means to apply a plurality of constant currents to said capacitor includes means responsive to transitions of said comparator to cause the next of said constant currents to be produced.

3. In an analog to digital converter having a capacitor which is charged to a potential proportional to an unknown analog signal, a comparator having a first input connected to said capacitor and a second input connected to a reference potential, said comparator producing a first output when its first input is larger than its second, and producing a second output when its second input is larger than its first, and having a transition from one output to the other when its two inputs become equal, the improvement comprising:

a plurality of potential sources of positive and negative potentials;

current regulating means connected to each of said sources to produce currents of different magnitudes;

switch means connected between each of said current regulating means and said capacitor for applying said currents to said capacitor when said switch means are closed;

switch operating signal producing means connected to each of said switch means to cause said switch means to close when a signal is produced;

synchronous counter means connected to each of said switch operating signal producing means to measure the durations of said switch operating signals; and means responsive to transitions of said comparator to cause each of said switch operating signal producing means to produce signals in a sequential manner.

References Cited

UNITED STATES PATENTS

| | | | |
|---|---|---|---|
| 3,458,809 | 7/1969 | Dorey | 340—347 |
| 3,316,547 | 4/1967 | Ammann | 340—347 |
| 3,438,024 | 4/1969 | Smith | 340—347 |

MAYNARD R. WILBUR, Primary Examiner

J. GLASSMAN, Assistant Examiner

U.S. Cl. X.R.

320—1